United States Patent
Schauer

(10) Patent No.: US 8,255,606 B2
(45) Date of Patent: Aug. 28, 2012

(54) REMOTE ACCESS GATEWAY FOR SEMICONDUCTOR PROCESSING EQUIPMENT

(75) Inventor: Ronald Vern Schauer, Gilroy, CA (US)

(73) Assignee: Applied Materials, Inc., Santa Clara, CA (US)

( * ) Notice: Subject to any disclaimer, the term of this patent is extended or adjusted under 35 U.S.C. 154(b) by 351 days.

(21) Appl. No.: 12/603,333

(22) Filed: Oct. 21, 2009

(65) Prior Publication Data

US 2010/0138583 A1 Jun. 3, 2010

Related U.S. Application Data

(60) Provisional application No. 61/108,308, filed on Oct. 24, 2008.

(51) Int. Cl.
  *G06F 13/36* (2006.01)
  *G06F 19/00* (2011.01)
(52) U.S. Cl. .................. 710/312; 700/121
(58) Field of Classification Search .......... 710/312
  See application file for complete search history.

(56) References Cited

U.S. PATENT DOCUMENTS

| | | | | |
|---|---|---|---|---|
| 6,068,703 A * | 5/2000 | Chen et al. | ........... | 118/715 |
| 6,618,628 B1 * | 9/2003 | Davlin et al. | ........... | 700/3 |
| 6,622,286 B1 * | 9/2003 | Ngo et al. | ........... | 716/54 |
| 6,952,656 B1 * | 10/2005 | Cordova et al. | ........... | 702/117 |
| 2004/0034439 A1 * | 2/2004 | Watson | ........... | 700/86 |
| 2004/0087152 A1 * | 5/2004 | Lian et al. | ........... | 438/689 |
| 2006/0064188 A1 * | 3/2006 | Ushiku et al. | ........... | 700/96 |
| 2007/0009345 A1 * | 1/2007 | Hall et al. | ........... | 414/222.01 |
| 2007/0083282 A1 * | 4/2007 | Lim | ........... | 700/110 |
| 2007/0129824 A1 * | 6/2007 | Sato et al. | ........... | 700/56 |
| 2010/0087941 A1 * | 4/2010 | Assaf et al. | ........... | 700/101 |

FOREIGN PATENT DOCUMENTS

| KR | 10-2000-0052117 A | 8/2000 |
|---|---|---|
| KR | 10-2004-0088633 A | 10/2004 |
| KR | 10-2006-0064095 A | 6/2006 |

OTHER PUBLICATIONS

International Search Report and Written Opinion mailed May 13, 2010 for PCT Application No. PCT/US2009/061630.

* cited by examiner

*Primary Examiner* — Ryan Stiglic
(74) *Attorney, Agent, or Firm* — Moser Taboada; Alan Taboada

(57) ABSTRACT

An apparatus for providing an interface for semiconductor processing equipment is disclosed. In some embodiments, an apparatus for providing an interface for semiconductor processing equipment having an interface card includes a display logic subsystem to provide an interface to one or more devices such as video and information displays, light pens, keyboards, computer mice, and warning light networks and alarms via a data and control bus; a bridge to provide access to the data and control bus; and a local computer subsystem coupled to the bridge and the display logic subsystem, wherein the local computer subsystem provides access to one or more remote devices.

20 Claims, 3 Drawing Sheets

REMOTE ACCESS GATEWAY FOR SEMICONDUCTOR PROCESSING EQUIPMENT

CROSS REFERENCE TO RELATED APPLICATIONS

This application claims benefit of U.S. provisional application Ser. No. 61/108,308, filed Oct. 24, 2008, which is herein incorporated by reference.

BACKGROUND

1. Field

Embodiments of the present invention generally relate to semiconductor processing equipment, and more particularly to interfacing with a process controller for such equipment.

2. Description of the Related Art

As technology advances, it is desirable to upgrade obsolete equipment to provide faster, better, and more reliable operation. However, the upgrade of such equipment often comes at the price of a necessary reconfiguration of the operations environment. Often, it is undesirable to make changes to the operating environment due to the inherent danger of modifying mission critical system components. This danger is especially evident in the field of semiconductor processing, where a small change may upset a carefully configured system, resulting in decreased yields and other manufacturing defects. This risk causes many end users to be hesitant to upgrade their systems and instead accept problems and limitations of obsolete hardware. In particular, these limitations are found in the input and output interfaces of such semiconductor processing equipment. Modification of the input and output interfaces requires an update to system software, which presents a large risk to users who have carefully configured systems.

Accordingly, the inventor has provided an apparatus to provide a remote access gateway to wafer processing equipment that may facilitate providing a transparent upgrade path to the end user of the device.

SUMMARY

Apparatus and methods for providing an interface for semiconductor processing equipment is disclosed. In some embodiments, an apparatus for providing an interface for semiconductor processing equipment having an interface card includes a display logic subsystem to provide an interface to one or more devices such as video and information displays, light pens, keyboards, computer mice, and warning light networks and alarms via a control bus; a bridge to provide access to the control bus; and a local computer subsystem coupled to the bridge and the display logic subsystem, wherein the local computer subsystem provides access to one or more remote devices.

In some embodiments, an apparatus for providing an interface for semiconductor processing equipment having a Versa Module European (VME) interface card may include a display logic subsystem to provide an interface via a VME bus to one or more devices comprising video and information displays, light pens, keyboards, computer mice, and warning light networks and alarms, the display logic subsystem comprising a light pen memory for providing the local computer subsystem with access to one or more of light pen registers, offset calibrations, or cursor positions, and further comprising a video memory for providing the local computer subsystem with access to video display data; a first VME bridge coupled to the display logic subsystem to provide access to the VME bus; a local computer subsystem coupled to the VME bridge and the display logic subsystem, wherein the local computer subsystem provides access to one or more remote devices, and wherein the remote devices comprise at least one of a local video display, a high speed messaging services interface, a network interface, a secondary keyboard and mouse interface, or an external storage interface; a second VME bridge coupled to the local computer subsystem to provide access to the VME bus; a switch mechanism coupled to the local computer subsystem to provide fail-safe and local cutoff functionality wherein the switch mechanism automatically disconnects remote access in the event of a hardware failure; and a video interface providing video output and a light pen interface providing input access for a light pen tool coupled to the display logic subsystem.

In some embodiments, a method for providing an interface for semiconductor processing equipment having an interface card includes processing at least one of an input and an output using a local computer subsystem and accessing a display logic subsystem to perform the at least one input or output. Other and further embodiments of the present invention are discussed in greater detail, below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
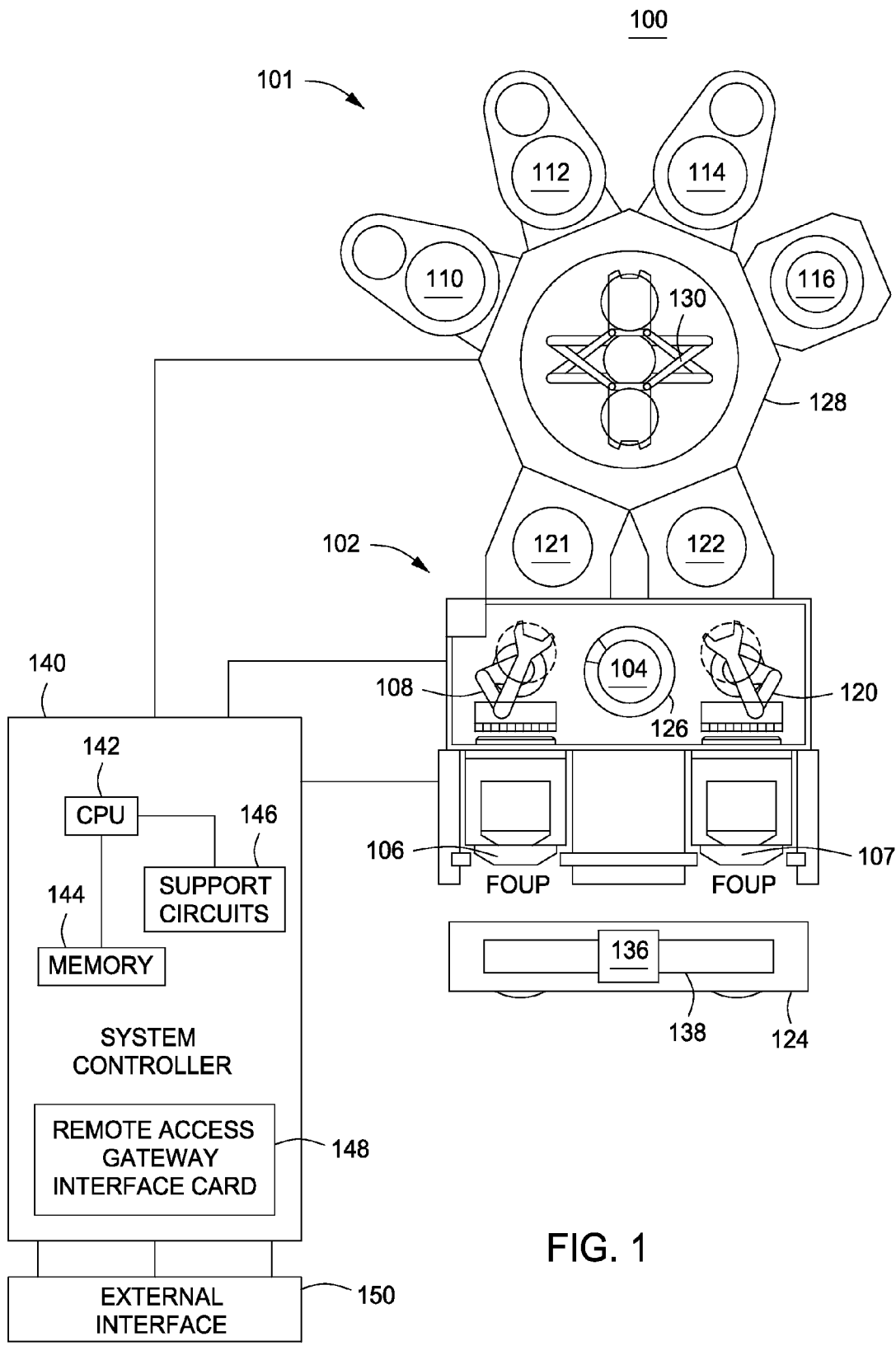
FIG. 1 depicts a block diagram of a system using an embodiment of the present invention to interface with a system controller of a semiconductor processing tool.

The drawings have been simplified for clarity and are not drawn to scale. To facilitate understanding, identical reference numerals have been used, wherever possible, to designate identical elements that are common to the figures. It is contemplated that some elements of one embodiment may be beneficially incorporated in other embodiments.

DETAILED DESCRIPTION

An apparatus for providing a remote access gateway for semiconductor processing equipment is described herein. The inventive apparatus advantageously provides an interface for video, light pen, and remote access capability. Additionally, the inventive apparatus consumes less power and generates less heat than previous efforts in the field, while occupying a similar card footprint as the legacy equipment being replaced. The apparatus also simulates the behavior and communications of the legacy video and light pen interfaces, so that no software changes to the system controller are necessary when legacy hardware is replaced with the apparatus. Although described herein in connection with legacy systems, the present invention may also be implemented on newly manufactured systems and/or existing non-legacy equipment.

The present invention may be utilized to advantage in numerous processing systems having interfaces that are not compatible with conventional remote access solutions. For example, due to one or more of non-standard card interfaces, video formats, video connections, user input methods, cables, monitors and input devices, video distribution hardware, light pens or equivalents, odd disk formats, custom operating systems, and other unique and proprietary items related to controls, interfaces, and accessibility, previous efforts in the field are inadequate for providing interface solutions to provide remote access and control for these processing systems. At least some embodiments of the present invention advantageously provide dual video and operator interfaces that can cross-communicate, remote connectivity, unique identification of each device, and direct driving of light pen registers and logic by remote means.

The synergy between provided sub-functions makes the invention unique and superior to previous attempts in the field. The necessary light pen registers, offset calibrations, and cursor position registers are readily accessible internally to the present invention on a display logic subsystem. Therefore, it is a great advantage for the local computer subsystem (remote access) module within the card to be able to directly access these resources. As no conversions or backplane bus interactions are involved, the process is "lossless" (e.g., there are no external data or signal conversions) as well as far faster than conventional apparatus. The ability to add overlays and other human interface functions locally or remotely (with rules and qualifications) reduces the chance of creating personnel or machinery hazards. Examples of suitable process tools include the PRECISION 5000® processing system, 200 mm CENTURA® and ENDURA® processing systems, and some PRODUCER® processing systems, all available from Applied Materials, Inc. of Santa Clara, Calif.

FIG. 1 depicts a schematic diagram of an exemplary integrated semiconductor substrate processing system (e.g., cluster tool) 100, similar to a 200 mm CENTURA® processing system, and having a remote access gateway in accordance with some embodiments of the present invention. The system 100 illustratively includes a vacuum-tight processing platform 101, an input/output module 102, and a system controller 140. The platform 101 generally includes processing modules 110, 112, 114 and 116 and at least one load-lock chamber (load-lock chambers 121 and 122 are shown), which are coupled to a common vacuum substrate transfer chamber 128.

The load-lock chambers 121 and 122 protect the transfer chamber 128 from atmospheric contaminants. The transfer chamber 128 comprises a substrate robot 130. In operation, the robot 130 transfers the substrates between the load lock chambers and processing modules.

The input/output module 102 comprises at least one docking station to accept one or more front opening unified pod (FOUP) (FOUPs 106 and 107 are shown) and at least one substrate robot (two robots 108 and 120 are shown). In some embodiments, the input/output module 102 may further comprise a metrology module 126 suitable for measuring critical dimensions of structures formed on substrates being processed. The robots 108 and 120 transfer the pre-processed and post-processed substrates between the FOUPs 106, measuring tool 104, and load-lock chambers 121, 122. In the depicted embodiment, the metrology module 126 is used as a pass-through module. In other embodiments, the metrology module 126 may be a peripheral unit of the input/output module 102.

The factory interface 124 is generally an atmospheric pressure interface used to transfer the cassettes with pre-processed and post-processed substrates disposed in the FOUPs 106, 107 between various processing systems and manufacturing regions of the semiconductor fab. Generally, the factory interface 124 comprises a substrate-handling device 136 and a track 138. In operation, the substrate-handling device 136 travels along the track 138 to transport the FOUPs between cluster tools or other processing equipment.

The system controller 140 is coupled to and controls modules and apparatus of the integrated processing system 100. The system controller 140 controls all aspects of operation of the system 100 using a direct control of modules and apparatus of the system 100 or, alternatively, by controlling the computers (or controllers) associated with these modules and apparatus. In operation, the system controller 140 enables data collection and feedback from the respective modules (for example, the metrology module 126) and apparatus that optimizes performance of the system 100.

The system controller 140 generally comprises a central processing unit (CPU) 142, a memory 144, and support circuits 146. The CPU 142 may be one of any form of a general purpose computer processor that can be used in an industrial setting. The support circuits 146 are conventionally coupled to the CPU 142 and may comprise cache, clock circuits, input/output subsystems, power supplies, and the like. The software routines, when executed by the CPU 142, transform the CPU into a specific purpose computer (controller) 140. The software routines may also be stored and/or executed by a second controller (not shown) that is located remotely from the system 100.

The system controller 140 is further coupled to one or more external interfaces 150. In one embodiment, the system controller 140 comprises one or more interface cards communicating via a data and control bus interface. Interface cards typically provide a way for external devices to access, send, and receive data across a data and control bus (such as a data and control bus 202 described below with respect to FIG. 2). The remote access gateway interface card 148 is an interface card, for example, occupying a 6U form factor in a single slot, which provides external interfaces 150 with access to the system controller 140 via the data and control bus. Utilizing a single card has the advantages of reducing the card slot footprint, power consumption, and cost, as compared to previous efforts in the field which separate the subsystems into multiple cards. The reduction in power consumption also leads to a net heat reduction. In some embodiments, the remote access gateway interface card 148 may be a Versa Module European (VME) interface card, with the data and control bus being a VME bus.

The external interfaces 150 may include one or more of a light pen, a video display, a keyboard, a mouse, a remote storage device, a computer network, and a high speed messaging system (HSMS) system. The remote access gateway interface card 148 allows a user to input commands for and receive feedback from the semiconductor processing tool 101 from a location remote from the system controller 140. Thus, the remote access gateway interface card 148 advantageously overcomes the conventional exclusion of external devices from access to internal data and control registers due to the inability to connect into the system controller data bus (which, conventionally, does not allow any external device to initiate or control access to internal bus and memory data due to the nature of the legacy controller I/O ports and disk drive bus). The remote access gateway interface card 148 further advantageously provides such remote access and control without the need to act as a bus master to be able to freely access data and memory in order to effect data uploads and downloads (as would be required with conventional equipment if they could connect into the system controller data bus). This is desirable because allowing such equipment to act as a bus master could easily cause system data loss or corruption and command processing faults, resulting in system crashes, which would be extremely disruptive and problematic due to the critical and potentially dangerous nature of the wafer processing equipment itself, the mechanisms incorporated within, and the flammable, toxic, corrosive, teratogenic, and pyrophorric materials very commonly used within the equipment.

Figure 2:
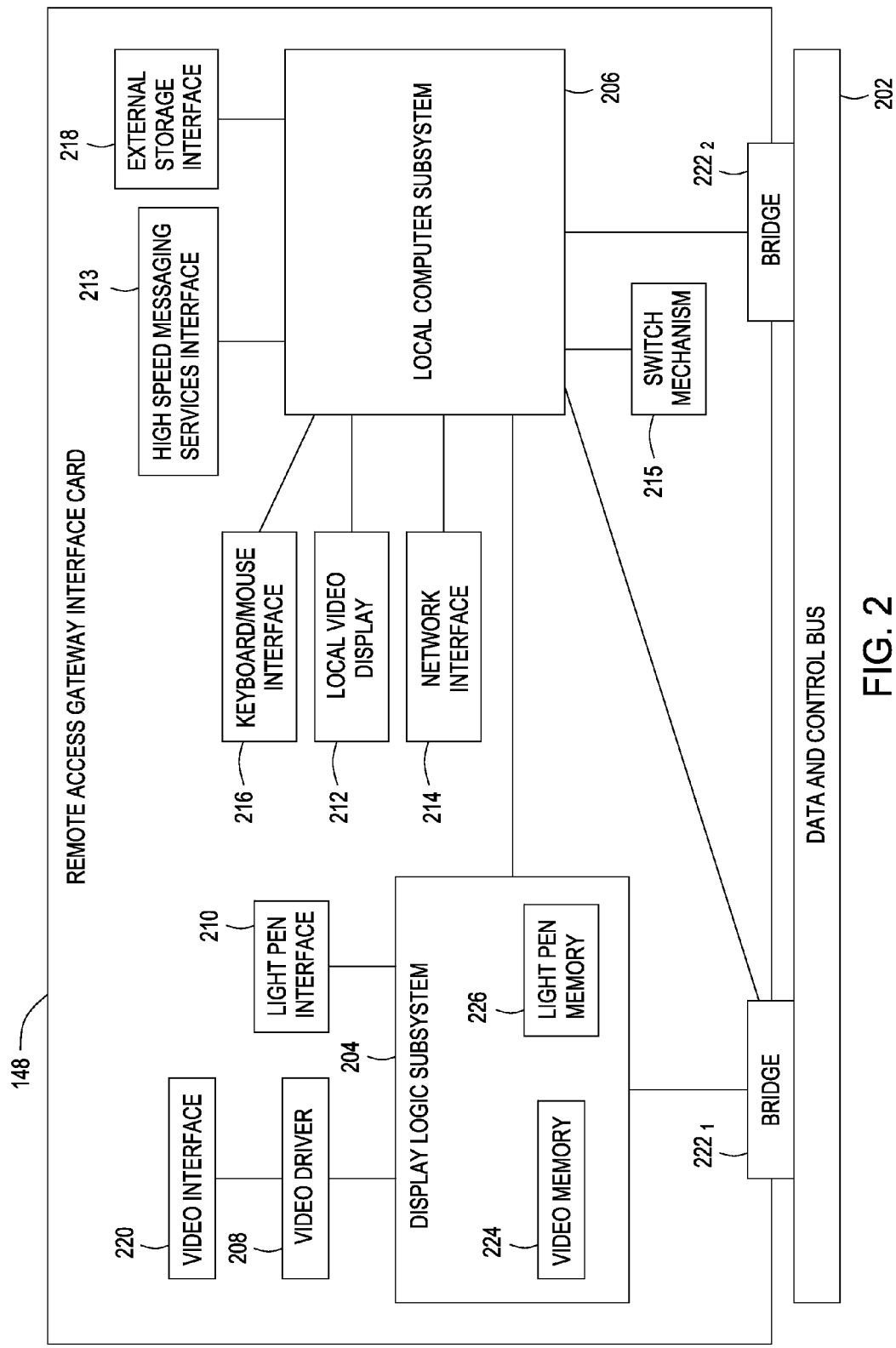
FIG. 2 depicts a block diagram of an embodiment of the present invention and a data and control bus.

FIG. 2 is a block diagram of the remote access gateway interface card 148 coupled to a data and control bus 202. The remote access gateway interface card 148 comprises two processing subsystems, the display logic subsystem 204 and the local computer system 206. Each subsystem is coupled to a bridge, which provides access to the data and control bus (e.g., a first bridge $222_1$ and a second bridge $222_2$, collectively bridges 222). In embodiments where the remote access gateway interface card 148 is a VME card, the bridges 222 may be VME bridges. In some embodiments, the two processing subsystems are implemented as two virtual computers located within one or more programmable systems or devices present on the remote access gateway interface card 148, for example, a field programmable gate array (FPGA). By implementing the processing subsystems via a FPGA, the operating life of the apparatus may be extended and is no longer coupled to particular hardware or a specific processing environment. The bridges 222 allow for communications between the local computer subsystem 206 and the host system controller (CPU 142) as well as an independent path for communications between the display logic system 204 and the host system controller (CPU 142). The two functions contained in the remote gateway interface 148 appear as completely separate memory and I/O spaces to the host system controller (CPU 142). In some embodiments, the two bridges 222 may be combined into a single gateway (e.g., a single bridge) that mimics the two separate logical paths. Because the two bridges 222 occupy the same bus connector and share the same I/O pins on the bus connector, only one of the two interfaces can communicate over the data and control bus 202 at any one moment.

In some embodiments, the remote access gateway interface card 148 may include a unique identifier that cannot be modified by an end-user, such as a silicon ID. In some embodiments, the silicon ID may be a logical identifier for purposes of uniquely identifying a particular card whenever EtherNet or InterNet communications are in progress. Otherwise if all the cards have the same ID, messages on the communications network would not be routed properly. In some embodiments, the silicon ID may also be a warranty ID enabler, and/or an enabler of robust feature locking and passwords (e.g., a passcode for one card will not work for another, thus enabling license management. This is analogous to the MacID on NICs and other network-capable devices). Thus, the remote access gateway interface card 148 provides for compliance with specific safety and regulatory equipment and protocols required to enable remote access and control. These standards exist within SEMI (Semiconductor Equipment Manufacturer's Institute) as well as within particular companies operating such equipment and the localities where operating.

In some embodiments, the remote access gateway interface card 148 may include a switch mechanism 215. The switch mechanism 215 may be comprised of key lock, guarded switch, or other secure mechanism to limit, enable or prevent remote communications, viewing, control and data transfers. The switch mechanism 215 may be implemented in either a hardware or software mechanism.

In some embodiments, the switch mechanism is further comprised of a series of status light bars or signal-configurable signage (by means of LED, lights, LCDs, etc) that may be mounted on, near, or remotely to the system mainframe and sub-component racks (e.g., a warning light system). These status indicators may indicate to local personnel that remote access functions are disabled, enabled but inactive, or enabled and active. In one embodiment, the status indicators consist of multiple triple light bars that are driven by means of a connection to the interface card.

In some embodiments, when the local access switch is turned off, the indicators light up green (or some other color), or perhaps not at all. When the local access switch is on but no communications are occurring, the status indicators may light up, for example, blue. When active remote control is engaged, the status indicators may light up, for example, amber and may blink. Other embodiments of these status indicators may include purpose-built signage, video displays, and the like.

In some embodiments, the display logic subsystem 204 may provide an interface for a video driver 208 and a light pen interface 210. The video driver 208 further outputs to a video interface 220. The display logic subsystem 204 provides the same functionality as a video/lightpen/user interface logic card (e.g., a legacy interface card). In this manner, external systems configured to send data for display on the legacy interface card do not need to be modified to interface with the new apparatus. The apparatus advantageously provides a complete replacement for the legacy interface card, which is increasingly difficult and expensive to replace due to its obsolescence.

Data to be output to the video driver 208 is contained within a video memory 224 stored within the display logic subsystem 204. In some embodiments, the video memory 224 may comprise a 4 kilobyte block of memory, which is then read by the video driver 208 for output to the video interface 220. The video interface 220 comprises a display device. The display logic subsystem 204 interacts with the video driver 208 by modifying data contained within this block of memory.

The display logic subsystem 204 also provides a light pen interface 210. The light pen interface 210 is responsible for tracking the position of a light pen device. The horizontal and vertical positions of the light pen are saved in a pair of memory locations, the light pen memory 226, provided in the display logic subsystem 204. The display logic subsystem 204 accesses these memory locations to determine the current location of the light pen device. In some embodiments, the display logic subsystem 204 may provide interfaces for the light pen device and legacy video display via, for example, a lower rear connector of the card.

The local computer subsystem 206 may provide an interface for a local video display 212, a high speed messaging service (HSMS) interface 213, a network 214, a keyboard and mouse interface 216, and an external storage device 218. In some embodiments, the local computer subsystem 206 may provide access to the above devices via, for example, an upper rear connector of the interface card.

Additionally, the local computer subsystem 206 may directly interact with the display logic subsystem 204 to access data pertaining to the video driver 208 and the light pen interface 210. The local video display 212 may comprise any video interface, such as a standard VGA display. The local computer subsystem 206 may access the video memory 224 contained within the display logic subsystem 204 to output to the local video display 212. The local computer subsystem 206 may then convert this data into a format suitable for output to the local video display 212. In this manner, the system is no longer tightly coupled to a display that must be compatible with the display logic subsystem 204. The local computer subsystem 206 may also write to the video memory 224 and in this manner affect output to the video interface 220. The local computer subsystem also may access the light pen memory 226. By reading the light pen memory 226, the local computer subsystem 206 may access the current location of the light pen device. The local computer subsystem 206 may also modify the data contained within the light pen memory 226 to provide a remote interface without requiring physical access to the light pen device.

In some embodiments, the local video display 212 is not directly coupled to the display logic subsystem 204. The local computer subsystem 206 may display additional data to the local video display 212 not contained within the video memory 224. For example, the local video display 212 may show an interface screen patterned after a "web" page for increased ease of interaction with the system controller 140, or the display may be configured to show diagnostic data to show the system's local and internal data, registers, storage media, and debugging data without connecting to, modifying, or otherwise disturbing the sensitive local internal system controller data bus and hardware.

In one embodiment, the remote access gateway interface card 148 further comprises an HSMS interface 213 coupled to the local computer subsystem 206. HSMS is an industry accepted message protocol based on the Semiconductor Equipment Communications Protocol (SECS-I) sent over Ethernet cabling. The HSMS interface 213 provides an input and output for devices using this protocol. The local computer subsystem 206 accepts these HSMS communications and propagates the communications across the data and control bus 202. Previous efforts in the field have required a separate card solution to enable a HSMS interface, making it impossible to install in systems with no free interface card slots. By providing a single card solution for video and external interfacing, the apparatus advantageously allows a system with no free interface card slots to upgrade to a HSMS interface without the need to install a larger card cage, which is an expensive, disruptive, and sometimes impossible process.

In some embodiments, the remote access gateway interface card 148 may further comprise a network interface 214 coupled to the local computer subsystem 206. The network interface 214 provides an interface for one or more remote network computers to interact with the system controller 140. As with the HSMS interface 213, the local computer subsystem 206 is responsible for translating and transporting commands received via the network interface 214 over the data and control bus. In some embodiments, the network interface 214 may provide multiple IP address EtherNet port connectivity via an integrated router/switch.

In some embodiments, the remote access gateway interface card 148 further comprises a keyboard and mouse interface 216. Instructions received via the keyboard and mouse interface 216 are then communicated to the local computer subsystem 206.

In some embodiments, the remote access gateway interface card 148 further comprises a storage interface 218. The local computer subsystem 206 may stream data to the storage interface 218 for storage and processing. The storage interface 218 may comprise an interface with any suitable media for external storage of data, such as a hard disk, a USB flash drive, a tape drive, a writable CD, or the like.

The local computer subsystem 206 is also coupled to one or more bridges 222. Coupling to the bridge advantageously allows the remote access gateway interface card 148 to operate as a bus master and to freely access data and memory to affect data uploads and downloads, along with providing the ability to completely address the entire memory space. By providing access through the local computer subsystem 206, external devices can affect such data transfers safely. Previous efforts in the field could easily cause system data loss, data corruption, and/or command processing faults when external devices attempted to access the data and control bus directly. Such faults have the potential to cause system crashes that may be extremely disruptive and problematic, as discussed above. In some embodiments, the local computer subsystem 206 may be coupled to the same bridge (e.g., bridge $222_1$) as the display logic subsystem 204. Coupling to this bridge $222_1$ advantageously allows the local computer subsystem 206 to directly access the memory associated with the video memory 224 and light pen memory 226 for enabling remote access, thereby facilitating the gathering of video output data for remote viewing and also allowing remote users to control the light pen registers as if actually present at the tool.

Figure 3:
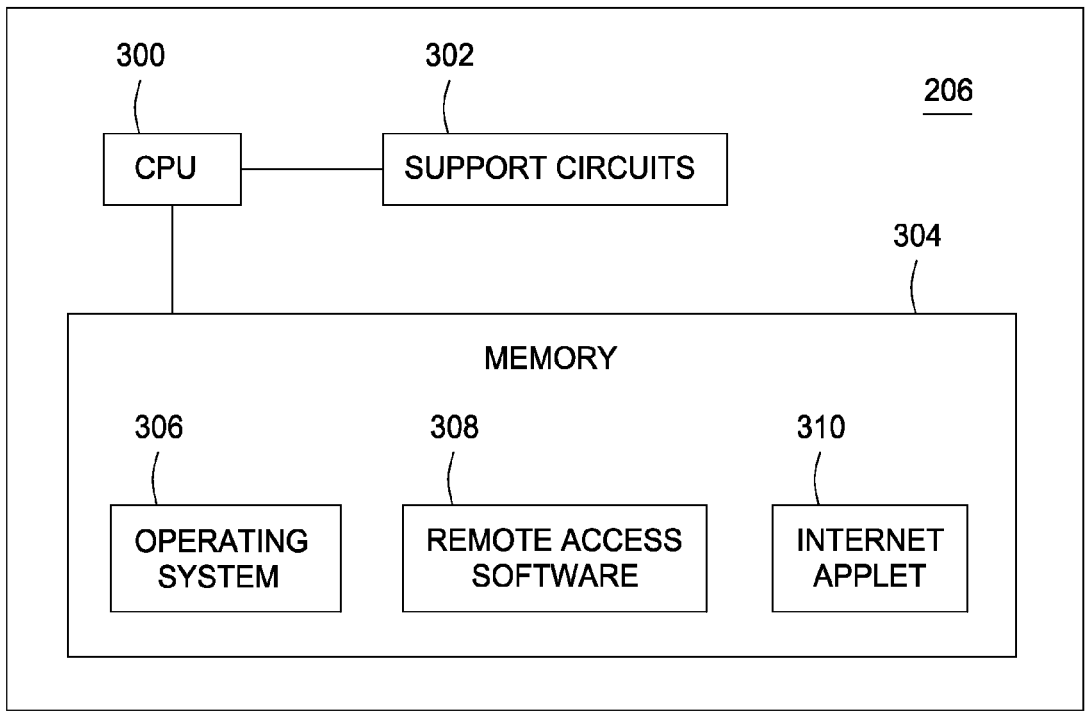
FIG. 3 depicts a block diagram of an embodiment of the local computer system component of the present invention.

FIG. 3 is a detailed block diagram of the local computer subsystem 206. The local computer subsystem 206 generally comprises a central processing unit (CPU) 300, a memory 304, and support circuits 302. The CPU 300 may be one of any form of a general purpose computer processor that can be used in an industrial setting. The support circuits 302 are conventionally coupled to the CPU 300 and may comprise cache, clock circuits, input/output subsystems, power supplies, and the like. The memory 304 may comprise random access memory, read only memory, removable storage, optical disk storage, disk drive storage, and combinations thereof. The memory 304 contains certain software routines, comprising an operating system 306, remote access software 308, and an internet applet 304. In operation, the CPU 300 executes one or more operating systems 306, such as DOS, WINDOWS, LINUX, or proprietary operating systems, to control the general utilization and functionality of the local computer subsystem 206. In some embodiments, the local computer subsystem 206 may also simulate the execution profile of one or more operating systems 306 to allow software designed for a specific architecture to run in a non-standard operating environment.

The memory 304 also contains remote access software 308. The remote access software 308 provides an interface via which a user may interact with the system controller 140 from a remote terminal. The remote access software 308 may be configured to accept input from the HSMS interface 213, the network interface 214, and/or the keyboard and mouse interface 216. The remote access software 308 parses input from one or more of the above external interfaces 150 and modifies the data within the display logic subsystem 204 and on the data and control bus 202 accordingly. For example, the remote access software 308 may be configured to accept mouse input via the keyboard and mouse interface 216 as a substitute for a light pen instruction. The remote access software 308 would translate the input from the mouse and modify the light pen memory 226 accordingly. In this manner, it is possible to provide system access to a remote user without necessitating any change to the system control software, as input instructions may be translated through the display logic subsystem 204.

The remote access software 308 may also provide access control and user authentication, preventing unauthorized system access. Such controls may include warning lights to indicate when a user is remotely accessing the system, fail-safe connection switching to the internet or other network such that communications to and from the computing device and a local area network will be restored automatically upon fault, or other means to limit, enable, or prevent remote communications viewing, control and data transfers. In one embodiment, such a means for control may include physical locks or guarded switches on the remote access gateway card 148 itself. In some embodiments, the remote connection is routed through a relay or other similar device so that if the local switch is turned off or the software that supports the remote access connection fails, the "normal" connection to the system controller is automatically restored. In some embodiments, since all hardware resides on a single card within the bus, if the card itself fails, the normal connection will fail by default. However, a relay may be required to positively cut off internet access for remote functions whenever the local key switch is turned off.

In some embodiments, the remote access software 308 may provide a "web" interface or another locally resident software application for the system controller to allow remote access, control, and data transfer to be performed by a remote user.

The memory 304 may further comprise an internet applet 310. The internet applet 310 is a program designed to execute from within a web browser on a remote computer. The internet applet 310 may be coded in a web executable scripted language, such as JAVASCRIPT. The internet applet 310 provides a mechanism to interface with the remote access software through a standard browser interface.

In one specific non-limiting example, a remote access gateway interface card may be provided including a computing device whose architecture, operating system and feature set provides a very particular combination of physical and computational capabilities, including at least some of, but not limited to, the following:

1. A VME 6U card form factor, occupying a single slot
2. Full bus master connectivity and capability
3. Legacy video and lightpen connectivity
4. Two independent and mutually exclusive video subsystems
5. Light pen interface implemented in hardware and software
6. Multiple IP address EtherNet port connectivity (integral router/switch)
7. A computing core for operating on-board hardware while allowing a plurality of operating systems, including but not limited to: DOS, Windows, Linux, and others (such as an Applied Materials proprietary OS), at least two of which will normally be used simultaneously
8. Integral mass storage means such as rotary disk drive, flash memory, and other forms of non-volatile memory
9. Expansion capability by very high speed communications port to enable co-processing and remote processing using similarly capable external devices
10. Full emulation of legacy video functions including enhanced memory-mapped graphics, screen attributes, light pen synchronization to the raster image, cursor generation, and special line driver and receiver functions uniquely suited for use with legacy tools, their installations and peripheral hardware such as legacy operator interface terminals
11. The ability to address the entire VME memory space and to transmit or receive portions thereof to or from a remote location under controlled conditions
12. An internet (aka: "web") based browser or other locally resident software application allowing remote access, control and data transfer functions to be performed by a user virtually anywhere in the world, perhaps located far from the computing device described herein and the substrate processing tool it is installed into
13. An internet (aka: "web") browser applet that the present invention is capable of sending through the remote connection allowing remote access, control and data transfer functions to be performed by a user virtually anywhere in the world, perhaps located far from the computing device described herein and the substrate processing tool it is installed into
14. An external hardware device capable of local and private communications with the computing device
15. The device in 12 having capability to drive a local set of warning lights, annunciators or other indicating devices during times when the computing device is engaged in remote control functions
16. The device in 12 having capability to perform video overlays ranging from semi-transparent to opaque to the local displays at the wafer processing tool including but not limited to communications, informational displays, safety interfaces and warnings, and security purposes.
17. The device in 12 having a fail-safe connection switching means to the internet or other data communication network such that communications to and from the computing device and a local data network will be restored automatically upon fault
18. The device in 12 having a key lock, guarded switch, or other secure means to limit, enable or prevent remote communications, viewing, control and data transfers
19. A silicon ID or other unique identification means that is not able to be modified, bypassed or otherwise defeated by an end user.

Figure 4:
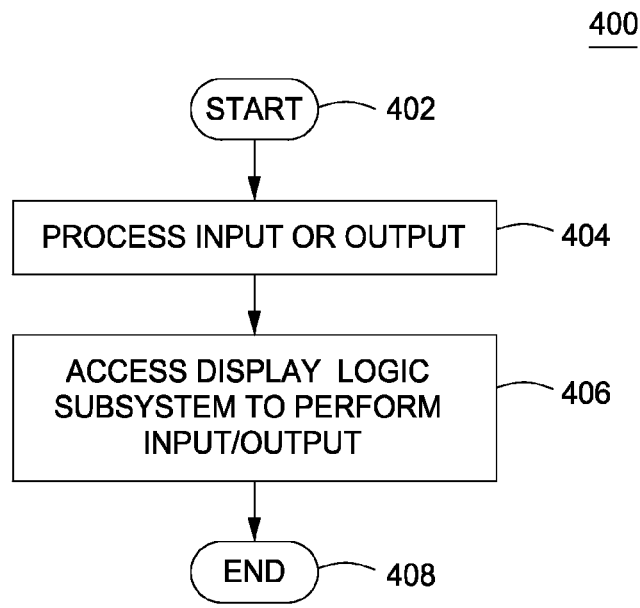
FIG. 4 depicts a flow diagram of an embodiment of a method for enabling remote access to semiconductor processing equipment.

FIG. 4 is a flow diagram of a method 400 for providing a remote access gateway for semiconductor processing equipment using a remote interface card comprised of a local computer subsystem and a display logic subsystem. The method 400 begins at step 402, prior to the receipt of an input or output command. At step 404, the local computer subsystem 206 receives an input from or an output to a remote device coupled to the semiconductor processing equipment. This input or output may comprise a command received from the keyboard/mouse interface 216, a message from the high speed messaging services interface 213 or network interface 214, a write out to the external storage interface 218, a new display for the local video display 212, and the like.

At step 406, the local computer subsystem 206 performs the input or output operation by accessing the display logic subsystem 204 in the manner described above with respect to FIGS. 2 and 3. For example, if a mouse input is received, the local computer subsystem 206 may manipulate the registers within the light pen memory 226 to translate the mouse input to a light pen input. If the operation is an output to the local video display 212, the local computer subsystem 206 may read the video memory 224 and process the data for output to the local video display 212. The method ends at step 408 after the input/output operation has been completed.

Thus, methods and apparatus for providing a remote access gateway for semiconductor processing equipment has been provided. The inventive apparatus advantageously addresses obsolescence issues associated with legacy video cards and light pens by providing full emulation for their functions and connections. The inventive apparatus advantageously provides additional capabilities to the legacy equipment without requiring any software changes to the system controller.

While the foregoing is directed to embodiments of the present invention, other and further embodiments of the invention may be devised without departing from the basic scope thereof.

What is claimed is:

1. An apparatus for providing an interface for semiconductor processing equipment having an interface card, the interface card comprising:
 a display logic subsystem to provide, via a data and control bus, an interface to a light pen and one or more video and information displays;
 a first bridge coupled to the display logic subsystem to provide access to the data and control bus;
 a local computer subsystem coupled to the first bridge and the display logic subsystem, wherein the local computer subsystem provides access to one or more remote devices; and
 a second bridge coupled to the local computer subsystem to provide access to the data and control bus.

2. The apparatus of claim 1 further comprising:
 a video interface providing video output to the one or more video and information displays; and
 a light pen interface providing input access for the light pen, wherein the video interface and the light pen interface are coupled to the display logic subsystem.

3. The apparatus of claim 1 wherein the one or more remote devices further comprise:
 at least one of a local video display, a high speed messaging services interface, a network interface, a secondary keyboard and mouse interface, or an external storage interface coupled to the local computer subsystem.

4. The apparatus of claim 1, wherein the display logic subsystem further comprises a light pen memory for providing the local computer subsystem with access to one or more of light pen registers, offset calibrations, or cursor positions.

5. The apparatus of claim 1, wherein the display logic subsystem further comprises a video memory for providing the local computer subsystem with access to video display data.

6. The apparatus of claim 5, wherein the local computer subsystem performs video post-processing to provide overlay and additional human interface functionality to the video display data.

7. The apparatus of claim 1, wherein the local computer subsystem provides a web based browser or other locally resident software application to allow remote access, control, and data transfer functions.

8. The apparatus of claim 1, wherein the local computer subsystem provides an applet capable of executing on a remote device to enable remote access, control, and data transfer functions to be performed by a user accessing the local computer subsystem over a network connection.

9. The apparatus of claim 1, further comprising:
 a switch mechanism coupled to the local computer subsystem to provide fail-safe and local cutoff functionality.

10. The apparatus of claim 1, wherein the data and control bus is a Versa Module European (VME) bus.

11. The apparatus of claim 1, further comprising:
 one or more warning lights to indicate that remote access functions are at least one of disabled, enabled but inactive, or enabled and active.

12. A method for providing an interface for semiconductor processing equipment having an interface card including a local computer subsystem and a display logic subsystem, comprising:
 processing at least one of an input or an output using the local computer subsystem that provides access between the semiconductor processing equipment and one or more remote devices; and
 accessing the display logic subsystem using the local computer subsystem to perform the at least one input or output, wherein the display logic subsystem comprises a video memory and a light pen memory.

13. The method of claim 12, further comprising receiving the input from the one or more remote devices.

14. The method of claim 13, wherein the one or more remote devices comprises at least one of a high speed messaging services interface, an external storage interface, a keyboard interface, a mouse interface, or a network interface.

15. The method of claim 12, further comprising providing the output to the one or more remote devices.

16. The method of claim 15, wherein the one or more remote device comprises at least one of a high speed messaging services interface, an external storage interface, a video display, or a network interface.

17. The method of claim 12, wherein the accessing step further comprises modifying the light pen memory using the local computer subsystem to provide the input to a system controller coupled to the semiconductor processing equipment.

18. The method of claim 12, wherein the accessing step further comprises reading the video memory using the local computer subsystem to provide the output.

19. The method of claim 12, further comprising:
 providing a web application interface via the local computer subsystem for remote access to the semiconductor processing equipment.

20. An apparatus for providing an interface for semiconductor processing equipment having a Versa Module European (VME) interface card, comprising:
 a display logic subsystem to provide an interface via a VME bus to one or more devices comprising video and information displays, light pens, keyboards, computer mice, and warning light networks and alarms, the display logic subsystem comprising a light pen memory for providing the local computer subsystem with access to one or more of light pen registers, offset calibrations, or cursor positions, and further comprising a video memory for providing the local computer subsystem with access to video display data;
 a first VME bridge coupled to the display logic subsystem to provide access to the VME bus;
 a local computer subsystem coupled to the first VME bridge and the display logic subsystem, wherein the local computer subsystem provides access to one or more remote devices, and wherein the one or more remote devices comprise at least one of a local video display, a high speed messaging services interface, a network interface, a secondary keyboard and mouse interface, or an external storage interface;
 a second VME bridge coupled to the local computer subsystem to provide access to the VME bus;
 a switch mechanism coupled to the local computer subsystem to provide fail-safe and local cutoff functionality wherein the switch mechanism automatically disconnects remote access in the event of a hardware failure; and
 a video interface providing video output and a light pen interface providing input access for a light pen coupled to the display logic subsystem.

* * * * *